2,831,835

FLUOROPROPIOLYL FLUORIDE AND POLYMERS THEREOF

William J. Middleton, Claymont, Del., assignor to E. I. du Pont de Nemours and Company, Wilmington, Del., a corporation of Delaware No Drawing. Application December 10, 1956
Serial No. 627,095

5 Claims. (Cl. 260—78.4)

This invention relates to new and useful organic fluoro compounds. It has as its major objects provision of these new compounds and of a process for their preparation.

The new compounds of this invention are monomeric fluoropropiolyl fluoride, $F-C \equiv C-COF$, and its polymers. The process of the invention is the process of preparing fluoroacetylenic compounds, including fluoropropiolyl fluoride, by the thermal decomposition of difluoromaleic anhydride at a temperature in the range of 500–1000° C.

The product of the thermal decomposition of difluoromaleic anhydride contains, in addition to fluoropropiolyl fluoride and its polymer, at least one other fluoroacetylenic compound, difluoroacetylene, $F-C \equiv C-F$. This product has previously been reported in the literature (U. S. Patent 2,546,997). The reaction product also contains a dimer of difluoroacetylene having the empirical formula $C_4F_4$. Carbon dioxide and carbon monoxide are also present. While the mechanism of the pyrolysis is not known, the reaction can be represented, at least formally, by the equation:

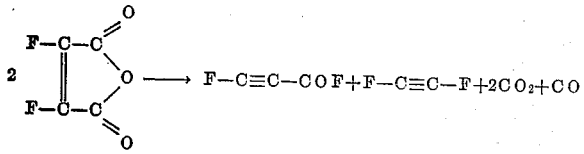

The following example illustrates the invention:

Example

A quartz tube, 2.5 cm. inside diameter, was packed for a length of 25 cm. with quartz rings and heated to 650° C. by means of an electric muffle furnace. Difluoromaleic anhydride was distilled through the tube at a pressure of 1–2 mm. of mercury and the exhaust gases were quenched in successive traps cooled by ice, carbon dioxideacetone and liquid nitrogen.

A light cream-colored solid was found in all the traps. Analysis showed that it was polymerized fluoropropiolyl fluoride.

Analysis.—Calc'd. for $(C_3F_2O)_n$: C, 40.02; F, 42.21. Found: C, 40.18; F, 41.42.

This polymer darkened after a few minutes' exposure to the atmosphere. It was at least partly soluble in acetone. It reacted exothermically with water and alcohol with evolution of hydrogen fluoride.

Monomeric fluoropropiolyl fluoride was isolated from the condensate in the liquid nitrogen trap. The lower boiling gases (CO, $CO_2$, $C_2F_2$) were first distilled off at low temperature and the residual liquid was purified by trap-to-trap distillation. Fluoropropiolyl fluoride, a colorless gas boiling at $-15°$ C., was identified by its mass spectrometer pattern, which indicated a molecular formula of $C_3F_2O$, and by its nuclear magnetic resonance spectrum which indicated two non-equivalent fluorines in equal ratios. Other possible structures for $C_3F_2O$ would have equivalent fluorines.

Fluoropropiolyl fluoride is stable below $-15°$ C. but it is not stable at room temperature either in the liquid or gaseous phase. It polymerizes rapidly, even when care is taken to exclude air. The polymer is a light yellow solid similar in appearance and properties to the solid obtained directly as one of the products of the pyrolysis of difluoromaleic anhydride.

When the condensate in the liquid nitrogen trap was distilled directly at low temperature and very low pressure into the mass spectrometer cell, the pattern given by the instrument for this sample showed a very large peak at mass 62, indicating the presence of difluoroacetylene. When, however, the condensate in the liquid nitrogen trap was allowed to warm and expand into an evacuated gas sample tube, there was, at least on some occasions, emission of light and some charring. The above-noted peak at mass 62 was not present after such a flash had taken place. The mass spectrometer pattern of the gases collected, regardless of whether or not a flash had occurred, indicated the presence, besides carbon dioxide, of fluoropropiolyl fluoride and of a compound of mass corresponding to the formula, $C_4F_4$, of a dimer of difluoroacetylene. There was no compound of molecular weight higher than $C_4F_4$ present in the mixture. The difluoroacetylene dimer, which boils at about 0° C., is unstable in the gaseous form at room temperature and changes to other products, presumably polymeric, upon standing for a few hours.

In the process of this invention the temperature employed for the thermal decomposition of difluoromaleic anhydride can be varied widely, from about 500° C. to about 1000° C. or even higher. The preferred temperature range is that between about 550° and 800° C. At the lower temperatures, e. g., 500–650° C., fluoropropiolyl fluoride is the predominant reaction product, but the decomposition is incomplete and some unchanged difluoromaleic anhydride is found in the cold traps. At higher temperatures, decomposition of the difluoromaleic anhydride is complete but the amount of $C_2F_2$ and $C_4F_4$ in the reaction product increases.

The means used to heat the vapors of difluoromaleic anhydride (B. P. 128° C.) to the decomposition temperature are not critical. In the above example, quartz is used as a means of heat exchange, but other materials, such as silica, glass, porcelain, etc., which are inert toward difluoromaleic anhydride and its decomposition products, can be used. No added catalyst is needed for the thermal decomposition.

Pressure is not a critical variable, and the process may be carried out at atmospheric pressure. However, it is preferred to operate at reduced pressure, for example, in the range of 0.1–100 mm. of mercury. An inert diluent gas such as nitrogen can be used if desired, particularly when pressures higher than about 100 mm. of mercury are used. Rapid removal of the pyrolysis products from the heating zone, which is facilitated by the use of reduced pressure, is recommended in order to minimize further thermal decomposition.

The difluoromaleic anhydride used as the starting material in the process of this invetion can be prepared from vinylidene chloride and chlorotrifluoroethylene by the following series of reactions:

Step 1.—A mixture of 350 parts of vinylidene chloride, 300 parts of chlorotrifluoroethylene and 1 part of hydroquinone is heated at 180° C. for 10 hours under autogenous pressure. The product is filtered from the polymer formed and distilled to give 266 parts of 1,1,2-trichloro-2,3,3-trifluorocyclobutane, B. P. 120–121° C., $n_D^{25}$ 1.4139.

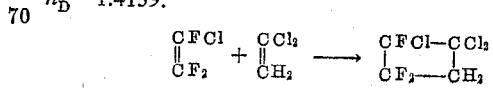

*Step 2.*—To a stirred solution of 555 parts of 1,1,2-trichloro-2,3,3-trifluorocyclobutane in 607 parts of anhydrous ether is added slowly 289 parts of triethylamine, and the mixture is allowed to stand for 20 hours. There is then added 1200 parts of water and 90 parts of 37% aqueous hydrochloric acid to dissolve the excess triethylamine and triethylamine hydrochloride. After stirring thoroughly, the organic layer is separated, washed with water and dried. Distillation gives 400 parts of 1,4-dichloro-3,3,4-trifluorocyclobutene, B. P. 91–92° C., $n_D^{25}$ 1.3942

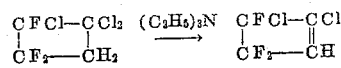

*Step 3.*—To a cooled, stirred solution of 153 parts of potassium hydroxide and 718 parts of potassium permanganate in 4000 parts of water is added 410 parts of 1,4-dichloro-3,3,4-trifluorocyclobutene during 2.5 hours. The mixture is then stirred 10 hours at room temperature and filtered. The filtrate is concentrated to about one-third of its volume, treated with 543 parts of concentrated sulfuric acid and extracted with ether. The ether solution is dried and the solvent is evaporated. The residue (chlorotrifluorosuccinic acid) is taken up in methylene chloride. Part of the product crystallizes out, and this is filtered off and washed with methylene chloride. By judiciously adding a small amount of water to the filtrate, more crystalline product is obtained, giving a total of 409 parts of white, very hygroscopic chlorotrifluorosuccinic acid, M. P. 55° C. after drying over phosphorus pentoxide.

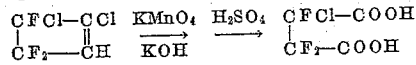

*Step 4.*—To 322 parts of chlorotrifluorosuccinic acid in 725 parts of dioxane is added in portions with stirring 121 parts of 95% zinc dust. The temperature is kept at 40–50° C. The mixture is stirred for 15 hours longer, then the solution is decanted and the dioxane is evaporated off. After dissolving the residue in water and adding 188 parts of concentrated sulfuric acid, the trifluorosuccinic acid is extracted with ether and the ether solution is dried and evaporated to dryness. The residue is washed with methylene chloride. There is obtained 236 parts of a crystalline product, M. P. 95–96° C. after recrystallization from ether-chloroform, which is a complex of two molecules of trifluorosuccinic acid with one of dioxane.

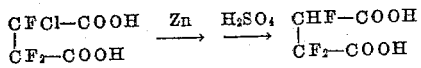

*Step 5.*—To 198 parts of 85% potassium hydroxide in 1580 parts of absolute ethanol is added 216 parts of the trifluorosuccinic acid/dioxane complex. The mixture is stirred and refluxed for 5 hours, then cooled and the solid is filtered off. The solid is dissolved in 500 parts of water, the solution is decolorized with charcoal and acidified with 150 parts of 37% aqueous hydrochloric acid. Potassium acid difluoromaleate precipitates and is filtered off. This salt (104 parts) is stirred with 500 parts of 50% sulfuric acid and the solution is extracted with ether to give 84 parts of difluoromaleic acid, M. P. 219–220° C. after recrystallization from acetone/benzene.

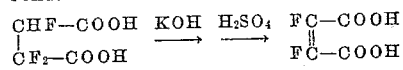

*Step 6.*—Difluoromaleic acid (75 parts) and 75 parts of phosphorus pentoxide are heated in a still and difluoromaleic anhydride distills over. This is redistilled through a column to give 58.5 parts of difluoromaleic anhydride, B. P. 128° C., $n_D^{25}$ 1.4179, M. P. 20° C.

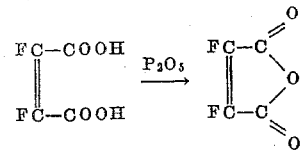

One of the uses of fluoropropiolyl fluoride lies in its ability to polymerize spontaneously. The resulting polymer is itself quite reactive. On treatment with water or alcohols, it is readily converted to polymers containing a multicplicity of carboxy or carboalkoxy groups attached to the carbon atoms of the polymer chains. These products, which have low flammability, can be molded under heat and pressure to prepare molded objects, such as coil forms and slot insulation for electric motors. Since fluoropropiolyl fluoride polymerizes in the gas phase at room or moderate temperature, its polymer can form directly on porous or nonporous surfaces, e. g., fabrics or steel, and can be reacted directly, e. g., with water vapor, on the coated or impregnated substrates to form useful coatings. Polymeric fluoropropiolyl fluoride also finds use as an alkylation promoter because of its ability to evolve hydrogen fluoride (an alkylation catalyst) in contact with atmospheric moisture.

Since obvious modifications in the invention will occur to those skilled in the chemical arts, I propose to be bound solely by the appended claims.

The embodiments of the invention in which an exclusive property or privilege is claimed are defined as follows:

1. Fluoropropiolyl fluoride.
2. A polymer of fluoropropiolyl fluoride.
3. The process of preparing fluoroacetylenic compounds which comprises thermally decomposing difluoromaleic anhydride at a temperature of about 500–1000° C.
4. The process of claim 3 in which the temperature is about 550–800° C.
5. The process of preparing fluoropropiolyl fluoride and polymers thereof which comprises thermally decomposing difluoromaleic anhydride at a temperature of about 500–650° C.

No references cited.